United States Patent [19]

McCarroll et al.

[11] Patent Number: 4,600,571
[45] Date of Patent: Jul. 15, 1986

[54] CATALYSTS AND THEIR USE IN AMMONIA PRODUCTION

[75] Inventors: John J. McCarroll, Camberley; Stephen R. Tennison; Nicholas P. Wilkinson, both of Weybridge, all of England

[73] Assignee: The British Petroleum Company p.l.c., Sunbury-on-Thames, United Kingdom

[21] Appl. No.: 586,976

[22] Filed: Mar. 7, 1984

[30] Foreign Application Priority Data

Apr. 18, 1983 [GB] United Kingdom ............... 8307612

[51] Int. Cl.$^3$ .............................................. C01C 1/04
[52] U.S. Cl. .................................... 423/363; 502/183
[58] Field of Search ....................................... 423/363

[56] References Cited

U.S. PATENT DOCUMENTS 4,142,993  3/1979  Elofson et al. ............... 423/363
4,163,775  8/1979  Foster et al. ................. 423/363

Primary Examiner—John Doll
Assistant Examiner—Wayne A. Langel
Attorney, Agent, or Firm—Morgan, Finnegan, Pine, Foley & Lee

[57] ABSTRACT

Catalysts as prepared by impregnating a carbon support with a halogen-containing compound of Ru, reducing the Ru to metal with hydrogen, and then depositing an alkali metal and a barium compound. The catalysts may be used for ammonia production.

3 Claims, No Drawings

CATALYSTS AND THEIR USE IN AMMONIA PRODUCTION

The present invention relates to the production of ammonia and to novel catalysts for use in the process.

GB Pat. No. 1 565 074 (British Petroleum) discloses a process for the production of ammonia from nitrogen and hydrogen using a catalyst comprising certain defined transition metals, eg ruthenium, together with a modifying metal ion, deposited on carbon of defined surface characteristics. The modifying metal ion is a Group IA or IIA metal ion eg K, Ba. There is no suggestion in the specification that there is any advantage in using mixtures of different modifying metal ions, as opposed to using the equivalent quantity of a single modifying metal ion.

U.S. Pat. No. 4,142,993 (Research Council of Alberta) discloses a process for making a catalyst based on an activated carbon support and containing ruthenium, barium, and potassium. However, example 6 of this patent shows that the order of addition of these metals is critical if high activity for ammonia production is to be achieved. The barium must be deposited first, then the ruthenium, and then potassium hydroxide. If ruthenium is deposited first, the activity of the catalyst is significantly reduced. The barium is stated to prepare the surface of the carbon for the ruthenium which is deposited subsequently.

We have prepared catalysts using the technique described in U.S. Pat. No. 4,142,993, but using heat-treated carbon of the type disclosed in GB Pat. No. 1565074 as support. We have compared these with catalysts prepared on heat-treated carbon using the technique described in GB Pat. No. 1565074 using similar amounts of ruthenium but with the barium replaced by an additional amount of potassium. When these catalysts were tested for ammonia production, we found that the maximum conversion to ammonia was very similar and was reached at very similar temperatures. In the commercial production of ammonia from synthesis gas high catalyst activities are desirable in order to reduce the total quantity of catalyst required for a given level of production. A long catalyst bed requires a larger reactor which is itself expensive. It also results in an increased pressure drop in the reactor which is undesirable as it increases energy consumption.

The maximum ruthenium content mentioned in U.S. Pat. No. 4,142,993 is 4% by weight of the support. We have found that U.S. Pat. No. 4,142,993 is correct in giving this as the upper limit in the process of U.S. Pat. No. 4,142,993. An increase in the amount of ruthenium used in the catalyst preparation in the process of U.S. Pat. No. 4,142,993 does not give any substantial increase in catalyst activity to compensate for the increased cost of the catalyst resulting from its higher content of expensive ruthenium.

Our studies have shown that the catalysts prepared according to the disclosure of U.S. Pat. No. 4,142,993 using activated carbon have activities which are too low for acceptable commercial ammonia production. Even when the activated carbon is replaced by heat treated carbon the activity is still relatively low. The activity cannot be usefully increased by increasing the proportion of ruthenium in the catalyst. The activity of catalysts containing barium and potassium prepared according to U.S. Pat. No. 4,142,993 is not significantly greater than the activity of catalysts prepared according to GB Pat. No. 1565074 containing an increased amount of potassium. It therefore appears that U.S. Pat. No. 4,142,993 contains no disclosure which is useful in obtaining highly active ammonia synthesis catalysts.

We have now surprisingly found that combinations of alkaline earth and alkali metal are advantageous in ammonia production catalysts provided that the alkaline earth and alkali metals are introduced at a specific stage in the catalyst preparation.

According to the present invention a process for the preparation of a catalyst suitable for the production of ammonia comprises impregnating a carbon support with a solution of a halogen containing compound of ruthenium, reducing the ruthenium compound to the metal with hydrogen, and then depositing a promoting water stable compound of an alkali metal and a promoting water stable compound of barium on the carbon.

Reference is made in this specification to elements from various groups of the Periodic Table. The Periodic Table referred to is that published the the United Kingdom Patent Office in the Classification Manual for Section C2 of the Patent Office classification dated 1980. In this Table Group IA includes the elements from hydrogen to francium.

In this specification the term "alkali metal" means the Group IA elements excluding hydrogen and lithium.

The ruthenium compound may be introduced onto the carbon support in the form of a solution of a compound of the metal in a suitable solvent. The solvent may be non-aqueous eg methanol. However it is preferred to use ruthenium halide compounds, in particular chloro-compounds in the form of their aqueous solutions. The preferred ruthenium compound in the material which is commercially available as "ruthenium chloride". This is not in fact pure $RuCl_3$ but is a complex mixture.

Any water or other solvent present in the support after the ruthenium halide has been deposited is preferably removed before proceeding to the next stage of catlayst preparation, ie reduction. This may be done by heating the impregnated carbon at temperatures in the range of 80° to 150° C.

The reduction step may be carried out over a moderately wide range of temperatures and pressures and hydrogen feed rates/space velocity, provided that sufficient time is allowed to remove substantially all the halogen. The reduction step is preferably carried out in the gas phase.

Examples of suitable temperature are those in the range 100° to 400° C., eg 150° to 400° C.

Examples of pressures which may be used are those in the range 1 to 40 bar.

Examples of suitable GHSV are 100 to 100,000.

Optimum reduction conditions can be readily determined by persons skilled in catalyst preparation.

The alkali metal and barium compounds are water-stable compounds i.e. they can be brought into contact with water without decomposition. The most convenient way of depositing the water-stable compound on the carbon support is by impregnation with an aqueous solution, and it is therefore preferred to use water soluble salts. The solubility in water is preferably sufficient to give the required content of alkali metal or barium in a single impregnation step. Preferably the alkali metal and barium are deposited together in a single step.

The concentration of the aqueous solution is not critical. The amount of solution used is preferably sufficient to fill all the pores of the support to give a good dispersion of the catalyst components on the support. The total amount of compound present in the solution brought into contact with the carbon (rather than its concentration) will determine the amount of the catalyst components left on the support after the solvent has evaporated.

Compounds which will have a promoting action on the ruthenium are disclosed in for example GB Pat. No. 1565074. Some compounds do not have a promoting action ie they do not give rise to catalyst with increased activity. Thus the presence of chloride ions will tend to negate the benefits conferred by the presence of alkali metal and barium and the presence of chloride ion in significant quantities should be avoided if a promoted catalyst is to be obtained. A number of substances are known to be catalyst poisons, eg $H_2S$, arsines, phosphines and compounds which decompose under the conditions of catalyst use to give such poisons will not of course be promoting compounds.

Thus, it is desirable to avoid the use of sulphur containing compounds as any liberation of sulphur during catalyst operation will adversely affect the activity of the catalyst. Whether an individual compound has a promoting action can be readily determined by preparing a ruthenium/carbon catalyst containing the compound alone and comparing its activity with a corresponding ruthenium/carbon catalyst containing no promoter. Examples of water-soluble salts which can be used to prepare the catalyst are carbonates, acetates and hydroxides. It is preferred to use nitrates, and more preferably nitrites.

The alkali metal is preferably potassium, rubidium or cesium. Combinations of cesium and barium are particularly preferred.

After the required quantity of alkali metal and barium has been deposited, the impregnated carbon is preferably dried for example at temperatures of 100° to 150° C.

The use of a combination of catalyst promoters in accordance with the present invention will show advantages on any carbon support. However the best results will be obtained by a careful choice of the carbon support.

The carbon is preferably in particulate form eg as pellets. The size of the carbon particles will depend on the pressure drop acceptable in any given reactor (which gives a minimum pellet size) and reactant diffusion constraint within the pellet (which gives a maximum pellet size). In a conventional ammonia process the preferred minimum pellet size is 0.5 mm and the preferred maximum is 10 mm, eg not more than 5 mm.

The carbons are preferably porous carbons. With the preferred particle sizes the carbons will need to be porous to meet the preferred surface area characteristics.

Carbons may be characterised by their BET, basal plane, and edge surface areas. The BET surface area is the surface area determined by nitrogen adsorption using the method of Brunauer Emmett and Teller J. Am Chem. Soc. 60,309 (1938). The basal plane surface area is the surface area determined from the heat of adsorption on the carbon of n-dotriacontane from n-heptane by the method described in Proc.Roy.Soc. A314 pages 473–498, with particular reference to page 489. The edge surface area is the surface area determined from the heat of adsorption on the carbon of n-butanol from n-heptane as disclosed in the Proc.Roy.Soc. article mentioned above with particular reference to page 495.

The preferred carbons for use in the present invention have a BET surface area of at least 100 $m^2/g$, more preferably at least 200 $m^2/g$, most preferable at least 300 $m^2/g$. The BET surface area is preferably not greater than 1000 $m^2/g$, more preferably not greater than 750 $m^2/g$.

The ratio of BET to basal plane surface area is preferably not greater than 4:1, more preferably not greater than 2.5:1. It is particularly preferred to use carbons with ratios of BET to basal plane surface area of not greater than 1.5:1.

It is preferred to use carbons with ratios of basal plane surface area to edge surface area of at least 10:1, preferably at least 100:1. It is not believed that there is an upper limit on the ratio, although in practice it will not usually exceed 200:1.

The preferred carbon support may be prepared by heat treating a carbon-containing starting material. The starting material may be an oleophilic graphite e.g. prepared as disclosed in GB Pat. No. 1 168 785 or may be a carbon black.

However oleophilic graphites contain carbon in the form of very fine particles in flake form and are therefore not very suitable materials for use as catalyst supports. We prefer to avoid their use. Similar considerations apply to carbon blacks which also have a very fine particle size.

The preferred materials are activated carbons derived from vegetable materials e.g. coconut charcoal, or from the peat or coal or from carbonizable polymers. The materials subjected to the heat treatment preferably have particle sizes not less than these indicated above as being preferred for the carbon support.

The preferred starting materials have the following characteristics: BET surface area of at least 100, more preferably at least 500 $m^2/g$.

The preferred heat treatment procedure for preparing carbon supports having the defined characteristics, comprise successively (1) heating the carbon in an inert atmosphere at a temperature of from 900° C. to 3300° C., (2) oxidizing the carbon at a temperature between 300° C. and 1200° C., (3) heating in an inert atmosphere at a temperature of between 900° C. and 3000° C.

The oxidation step is preferably carried out at temperatures between 300° and 600° C. when oxygen (eg as air) is used as the oxidising agent.

The duration of the heating in inert gas is not critical. The time needed to heat the carbon to the required maximum temperature is sufficient to produce the required changes in the carbon.

The oxidation step must clearly not be carried out under conditions such that the carbon combusts completely. It is preferably carried out using a gaseous oxidizing agent fed at a controlled rate to avoid over oxidation. Examples of gaseous oxidising agents are steam, carbon dioxide, and gases containing molecular oxygen eg air. The oxidation is preferably carried out to give a carbon weight loss of at least 10% wt based on weight of carbon subjected to the oxidation step, more preferably at least 15% wt.

The weight loss is preferably not greater than 40% wt of the carbon subjected to the oxidation step, more preferably not greater than 25% wt of the carbon.

The rate of supply of oxidizing agent is preferably such that the desired weight loss takes place over at least 2 hours, more preferably at least 4 hours.

Where an inert atmosphere is required it may be supplied by nitrogen or an inert (Group 0) gas.

The total quantities of ruthenium present in the catalyst are preferably in the range 0.1 to 50, more preferably 1 to 30, more preferably 3 to 15, eg 5-12, most preferably 6 to 11 parts per 100 parts by weight of carbon.

The quantity of alkali metal and barium compound is preferably such as to leave on the carbon at least 0.005, more preferably at least 0.01, most preferably at least 0.02 moles of total Group IA and barium metal (calculated as the element) per mole of carbon, and more preferably not more than 0.1 moles per mole of carbon.

The mole ratio of alkali metal to barium (which will of course correspond to the ratio of number of atoms in the case of elements) is preferably in the range 0.1:1 to 10:1.

The catalyst of the present invention is particularly suitable for the production of ammonia by the reaction of nitrogen and hydrogen. The continuous gas phase reaction of hydrogen and nitrogen to give ammonia may for example be carried out at temperatures of 200° C. to 600° C., pressures of 30–350 bar (eg 30–300) and gas space velocities of 100–$10^6$ volume/volume/hour. It is preferred to use temperatures of 250°–500° C., more preferably 300°–450° C., pressures of from 30–250 bar, more preferably 40–150 bar and space velocities of 1000–10,000 vol/vol/h.

Preferably the molar ratio of hydrogen to nitrogen in the feedstock is preferably in the range 0.25:1 to 3.2:1, more preferably 0.5:1 to 2:1.

The invention will now be described by reference to the following examples, in which examples of the invention are identified by numerals and comparative tests not according to the invention are identified by letters.

COMPARATIVE TESTS A–E

The carbon used as support was prepared from a commercially available extrudate activated carbon sold by Degussa under the designation Katepon BKIV. The carbon was in the form of extrudates of 4 mm diameter and had typical BET, basal plane, and edge surface areas of 939,182 and 32 $m^2/g$ respectively. The activated carbon was heat treated as follows. The carbon was heated from room temperature in a stream of helium to 1700° C. over a period of about 1 hour. When the temperature reached 1700° C. the carbon was allowed to cool in the stream of helium to 25° C. The carbon was then heated in air in a muffle furnace at approximately 520° C. for a time known from experience to give a weight loss of 20% wt. The carbon was then heated in helium to between 1800° C. and 1850° C. as in the helium heating step mentioned above. The carbon was allowed to cool to room temperature in an helium atmosphere.

This graphite-containing carbon had the following characteristics
BET surface area 710 $m^2/g$
basal plane surface area 389 $m^2/g$
edge surface area 2.3 $m^2/g$
BET/basal surface area ratio 1.8
basal/edge surface area ratio 169

The carbon was impregnated with an aqueous solution of the material commercially available as ruthenium trichloride so as to deposit a quantity of ruthenium trichloride corresponding to 10 parts by weight Ru per 100 parts by weight of carbon. Water was evaporated from the carbon in a rotary evaporator and the carbon was then dried in an oven at 100° C. It was then reduced in a stream of hydrogen at 200° C. for 2 hours.

After cooling, the carbon was then impregnated with an aqueous solution of potassium nitrite. The impregnated carbon was then ground and particles in the size range 16–30 mesh were used in the ammonia production experiments. A sample (1.6 cc) of an impregnated carbon made as above was placed in a tubular micro reactor adapted to be supplied with a stream of gas. The impregnated carbon was activated by passing over it with a stream of hydrogen at 60 ml/min while raising the temperature at the rate of 5° C./min to 450° C., and holding it at 450° C. for 1¼ hours. After this time evolution of water had ceased.

A mixture of hydrogen and nitrogen in a mole ratio of 3:1 was then passed over the resulting activated catalyst at a pressure of 6 bar absolute, a temperature of 320° C. and a gas hourly space velocity (GHSV) of 1300. The activities as measured by the percentage of ammonia in the reactor effluent gas are given in Table 1.

COMPARATIVE TESTS F–J

Experiments were carried out as in Tests A–E but using catalysts containing barium prepared by impregnating the carbon with an aqueous solution of Ba(NO$_2$)$_2$.H$_2$O. The results are shown in Table 1.

EXAMPLES 1–4

Experiments were carried out as in Tests A–E but using catalysts prepared by impregnation with an aqueous solution of mixtures of KNO$_2$ and Ba(NO$_2$)$_2$.H$_2$O. The results are shown in Table 1.

COMPARATIVE TEST K

This is a comparative experiment not according to the invention. A catalyst was prepared as in Comparative Tests A–E but using CsNO$_3$. The results are given in Table 1.

EXAMPLE 5

An experiment was carried out as in Test K but a catalyst containing barium in addition to cesium was prepared by impregnation with an aqueous solution of Ba(NO$_2$)$_2$.H$_2$O in addition to CsNO$_3$. The results are shown in Table 1.

TABLE 1

| Experiment | Promoter Loading (mol/mol carbon) | | | Activity/% NH$_3$ at 320° C. |
|---|---|---|---|---|
| | Potassium | Cesium | Barium | |
| A | 0.061 | — | — | 3.53 |
| B | 0.052 | — | — | 4.05 |
| C | 0.039 | — | — | 3.42 |
| D | 0.031 | — | — | 3.64 |
| E | 0.015 | — | — | 0.92 |
| F | — | — | 0.061 | 2.31 |
| G | — | — | 0.046 | 2.61 |
| H | — | — | 0.031 | 2.35 |
| I | — | — | 0.015 | 1.21 |
| J | — | — | 0.0077 | 1.19 |
| 1 | 0.054 | — | 0.0077 | 5.32 |
| 2 | 0.046 | — | 0.015 | 5.46 |
| 3 | 0.031 | — | 0.031 | 3.18 |
| 4 | 0.015 | — | 0.046 | 3.16 |
| K | — | 0.046 | — | 4.42 |
| 5 | — | 0.046 | 0.015 | 6.03 |

A consideration of the results obtained for Test A–E shows that under the reaction conditions an increase in the potassium content (once a minimum level has been exceeded) does not lead to a very large increase in activity. The results for Test F–J show the same pattern.

Examples 1 to 3 all show a higher activity for the K/Ba combination at 0.61 mol/mol carbon than for K alone at the same total promoter content. It is true that Example 4 shows a lower activity than Test A. However the content of Ba measured as mol/mol C is higher than the K content, and Example 4 should be compared with the results obtained for Ba alone (Tests F–J) from which the superiority of the Ba/K combination is clearly apparent.

A comparison of Test K and Example 5 clearly show the large increase in activity when a small quantity of barium is added to a cesium promoted catalyst.

Further experiments were carried out in a larger scale reactor using the catalysts used in the previous experiments.

A mixture of hydrogen and nitrogen (molar ratio 1:1) was passed over the catalyst at 370° C., a pressure of 71 bar absolute and a GHSV of 30,000.

TESTS L AND M

These were comparative tests not according to the invention, using catalysts containing as promoter potassium, and cesium respectively. The results are given in Table 2.

EXAMPLES 6, 7, 8 and 9

These show the results obtained using combinations of potassium and barium (Example 6) cesium and barium (Examples 7, 8). The results are shown in Table 2.

TABLE 2

| Experiment | Promoter Loading (mol/mol carbon) | | | Activity/% $NH_3$ at 370° C. |
| --- | --- | --- | --- | --- |
| | Potassium | Cesium | Barium | |
| L | 0.061 | — | — | 4.2 |
| 6 | 0.031 | — | 0.031 | 8.8 |
| M | — | 0.046 | — | 6.8 |
| 7 | — | 0.046 | 0.015 | 12.1 |
| 8 | — | 0.053 | 0.0076 | 12.0 |
| 9 | — | 0.058 | 0.0305 | 10.1 |

A comparison of Test L and Example 6 shows the very considerable increase in activity obtained at the same total promoter content when using K/Ba instead of K alone.

TEST N

This was a comparative test, not according to the invention.

A catalyst was prepared as in Example 1 of U.S. Pat. No. 4,142,993 ie using in sequence aqueous solutions containing 2% Ba based on carbon, as $Ba(NO_3)_2$, 4% Ru based on carbon as $RuCl_3$ and 12% K, based on carbon, as KOH. The carbon was baked as described in Example 1 of U.S. Pat. No. 4,142,993 after each deposition step. A catalyst was prepared according to U.S. Pat. No. 4,142,993, Example 1, but using a heat treated carbon as support in place of activated carbon as used in U.S. Pat. No. 4,142,993.

The starting material for the preparation of the heat-treated carbon was a commercially available activated carbon sold by Degussa under the designation Katepon BK16. The carbon was in the form of extrudates of diameter 1.6 mm and had typical BET, basal plane, and edge surface areas of 1214, 164 and 32 $m^2/g$ respectively.

The carbon was heat treated in a nitrogen stream in a continuous furnace to approximately 1700° C. (hot zone residence time of approximately 45 minutes) and then cooled rapidly to room temperature. The carbon was then heated in air in a continuous rotary tube furnace to a maximum temperature of 540° C. for a total residence time of approximately 5 hours to give a total weight loss of 20% weight. The step of heating in nitrogen was then repeated to a temperature of approximately 1850° C.

After heat treatment the carbon had the following characteristics:
BET surface area 535 $m^2/g$
basal plane surface area 223 $m^2/g$
edge surface area 1.7 $m^2g$
BET/basal surface area ratio 2.4
basal/edge surface area ratio. 131
It was activated as in Tests A–E.
The catalyst was tested in a tubular micro reactor as in Tests A–E.

EXAMPLE 10

A catalyst was prepared as in Example 1 using a heat treated carbon prepared as in Example N.

The catalyst was prepared as in Example 1 but using a quantity of $KNO_2$ and $Ba(NO_2)_2.H_2O$ corresponding to the ruthenium content, barium, and potassium contents of the catalyst of Example 1 of U.S. Pat. No. 4,142,993.

The catalyst was activated and tested as in Comparative Test A–E.

The results are given in Table 3.

COMPARATIVE TEST O

A catalyst was prepared using the same support as in Comparative Test N. A catalyst containing Ru and K was prepared using solutions of the same concentration of $RuCl_3$ and K as in Comparative Test N. However the Ru and K were deposited by the process of Comparative Tests A–E and no Ba was deposited on the catalyst.

The activity of the catalyst was tested as in Comparative Test N and the results shown in Table 3.

TABLE 3

| Experiment | Max Activity % | T°C. max |
| --- | --- | --- |
| N | 3.7 | 365 |
| 10 | 4.05 | 355 |
| 0 | 3.7 | 365 |

A comparison of the results from Comparative Test N and Example 10 shows the significant increase in maximum ammonia conversion and a decrease in the temperature required to obtain maximum conversion obtained using the present invention compared with the catalyst prepared by the process of U.S. Pat. No. 4,142,993.

A comparison Test N and Test O shows that using the same support the catalysts prepared according to U.S. Pat. No. 4,142,993 offer no advantages over catalysts prepared using Ru and K alone.

EXAMPLE 11

A heat treated carbon was prepared as in Test N.
A catalyst was prepared from the carbon as follows.
The carbon was impregnated with an aqueous solution of ruthenium trichloride so as to give a theoretical Ru content of 10 parts per 100 parts of carbon.

Water was evaporated from the impregnated carbon in a rotary evaporator and the impregnated carbon was then dried in an oven at 100° C. It was then reduced in a stream of hydrogen at 200° C. for 2 hours.

After cooling the carbon was impregnated with an aqueous solution containing of $CsNO_2$ and as $Ba(NO_2)_2$-

$H_2O$; 10.5 parts of Ba and 51 parts of Cs per 100 parts of carbon and dried and heated as before.

The carbon was then ground and particles in the size range 16-30 mesh were tested for ammonia production in a tubular micro-reactor as in Tests A-E.

The maximum ammonia content in the exit gas and the temperature at which the maximum ammonia concentration was obtained as shown in Table 4.

EXAMPLE 12

An experiment was carried out as in Example 11 but using activated carbon of Test N which had not been heat-treated, and using 0.908 g of catalyst.

Results are shown in Table 4.

COMPARATIVE TEST P

This is a comparative experiment not according to the invention.

A catalyst was prepared using as support the heat treated carbon used in Test N. Barium, ruthenium and an alkali metal were deposited on the carbon in the same way as in Example 1 of U.S. Pat. No. 4,142,993. However in order to provide the closest comparison with Experiments 7 and 8 the Ba solution contained as Ba($NO_2$), the Ru solution contained as $RuCl_3$, and in place of a solution of a potassium salt, a CsOH solution was used containing 51% Cs. All these weights are based on weight of carbon.

The catalyst was tested for ammonia production, as in A-E.

The results are shown in Table 4.

TABLE 4

| Experiment | Ammonia conc. % | T°C. |
| --- | --- | --- |
| 11 | 6.2 | 324 |
| 12 | 4.15 | 340 |
| P | 3.95 | 354 |

$Ba(NO_2)_2$ and CsOH and ruthenium trichloride solutions used were selected so as to give a Ba content on the carbon of 10.5 parts per 100 parts of carbon and a Cs content of 51 parts per 100 parts of carbon and a Ru content of 10 parts per 100 parts of carbon.

We claim:

1. A process for the production of ammonia which comprises passing a gaseous mixture of nitrogen and hyorogen under ammonia synthesis conditions over a catalyst prepared by inpregnating a carbon support with a solution of a halogen-containing compound of ruthenium, reducing the ruthenium compound to the metal with hydrogen, and then depositing a promoting water stable compound of an alkali metal and a promoting water stable compound of barium on the carbon.

2. A process according to claim 1 wherein the temperature is in the range 200°-600° C., the pressure is in the range 30-300 bar and the gas space velocity is in the range 100-$10^6$ volume/volume/hour.

3. A process according to claim 1 wherein the temperature is in the range 300°-450° C., the pressure is in the range 40 to 150 bar and the space velocity is in the range 1000 to 100,000.

* * * * *